(12) United States Patent
Tachibana

(10) Patent No.: US 8,165,039 B2
(45) Date of Patent: Apr. 24, 2012

(54) WIRELESS COMMUNICATION SYSTEM, COMMUNICATION APPARATUS AND COMMUNICATION METHOD

(75) Inventor: Hideaki Tachibana, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 676 days.

(21) Appl. No.: 12/331,784

(22) Filed: Dec. 10, 2008

(65) Prior Publication Data

US 2009/0161630 A1   Jun. 25, 2009

(30) Foreign Application Priority Data

Dec. 21, 2007 (JP) ................................ 2007-331066

(51) Int. Cl.
*H04W 84/18* (2009.01)
(52) U.S. Cl. ........................................ 370/254; 370/465
(58) Field of Classification Search .................. 370/254, 370/338, 465
See application file for complete search history.

(56) References Cited

U.S. PATENT DOCUMENTS

| 7,688,772 | B2 * | 3/2010 | Sinivaara et al. | 370/318 |
| 2003/0081603 | A1 * | 5/2003 | Rune | 370/390 |
| 2004/0063458 | A1 * | 4/2004 | Hori et al. | 455/554.2 |
| 2006/0215576 | A1 * | 9/2006 | Yu et al. | 370/252 |

FOREIGN PATENT DOCUMENTS

JP   2005-086234   3/2005

* cited by examiner

*Primary Examiner* — Melvin Marcelo
(74) *Attorney, Agent, or Firm* — Cowan, Liebowitz & Latman, P.C.

(57) ABSTRACT

A communication apparatus holds information concerning a second network reported from a specific wireless terminal that has left a first network. In accordance with predetermined criteria, the communication apparatus decides a wireless terminal that is to be allowed to join the second network and notifies this wireless terminal so as to cause the specific wireless terminal to return to the first network. This wireless terminal uses the held information concerning the second network to discriminate the communication status of the second network and requests the specific wireless terminal to return in accordance with the communication status discriminated.

11 Claims, 15 Drawing Sheets

WIRELESS COMMUNICATION SYSTEM, COMMUNICATION APPARATUS AND COMMUNICATION METHOD

BACKGROUND OF THE INVENTION

1. Field of the Invention

The present invention relates to a wireless communication system constituted by a communication apparatus having a management function for managing a network and a plurality of wireless terminals for performing wireless communication via the network, the communication apparatus and a method of controlling the communication apparatus.

2. Description of the Related Art

Conventionally, a wireless LAN has an infrastructure mode in which the LAN is accessed via an access point, and an ad-hoc mode in which wireless terminals communicate with one another. Throughput of the overall wireless network is improved by exploiting these wireless channels effectively.

By way of example, if traffic concentrates at an access point of a wireless LAN system, a changeover instruction for changeover to the ad-hoc mode (another network) is issued to a wireless terminal managed by the access point, thereby preventing concentration of traffic. For example, see Japanese Patent Application Laid-Open No. 2005-086234.

In the example of the prior art described above, however, if a specific wireless terminal has left the network managed by the access point and has constructed another network, then the access point will not manage information concerning this other network. As a consequence, a problem which arises is that the network managed by the access point cannot issue an instruction to a wireless terminal participating in the other network to the effect that it wishes this wireless terminal to return to its own network.

SUMMARY OF THE INVENTION

Accordingly, an object of the present invention is to allow a wireless terminal to return to its original network from another network.

According to one aspect of the present invention, there is provided a wireless communication system constituted by a communication apparatus having a management function for managing a first network and a plurality of wireless terminals for performing wireless communication via the first network, wherein the communication apparatus comprises: a unit that holds information concerning a second network of which notification has been given from a specific wireless terminal that has left the first network; a unit that decides a wireless terminal, which is to be allowed to join the second network, in accordance with predetermined criteria; and a unit that notifies the decided wireless terminal so as to cause the specific wireless terminal to return to the first network managed by the communication apparatus; and the decided wireless terminal comprises: a unit that allows this wireless terminal to join the second network and determines communication status of the second network using the held information concerning the second network; and a unit that requests the specific wireless terminal to return in accordance with a result of the determination.

According to another aspect of the present invention, there is provided a communication apparatus of a wireless communication system constituted by the communication apparatus, which has a management function for managing a first network, and a plurality of wireless terminals for performing wireless communication via the first network, the apparatus comprising: a unit that holds information concerning a second network of which notification has been given from a specific wireless terminal that has left the first network; a unit that decides a wireless terminal, which is to be allowed to join the second network, in accordance with predetermined criteria; and a unit that notifies the decided wireless terminal so as to cause the specific wireless terminal to return to the first network managed by the communication apparatus.

According to still another aspect of the present invention, there is provided a communication method of a wireless communication system constituted by a communication apparatus having a management function for managing a first network and a plurality of wireless terminals for performing wireless communication via the first network, wherein the communication apparatus executes: a step of holding information concerning a second network of which notification has been given from a specific wireless terminal that has left the first network; a step of deciding a wireless terminal, which is to be allowed to join the second network, in accordance with predetermined criteria; and a step of notifying the decided wireless terminal so as to cause the specific wireless terminal to return to the first network managed by the communication apparatus; and the decided wireless terminal executes: a step of allowing this wireless terminal to join the second network and determining communication status of the second network using the held information concerning the second network; and a step of requesting the specific wireless terminal to return in accordance with the result of the determination.

Further features of the present invention will become apparent from the following description of exemplary embodiments with reference to the attached drawings.

DESCRIPTION OF THE EMBODIMENTS

Preferred embodiments of the present invention will be described in detail with reference to the drawings.

First Embodiment

Figure 1:
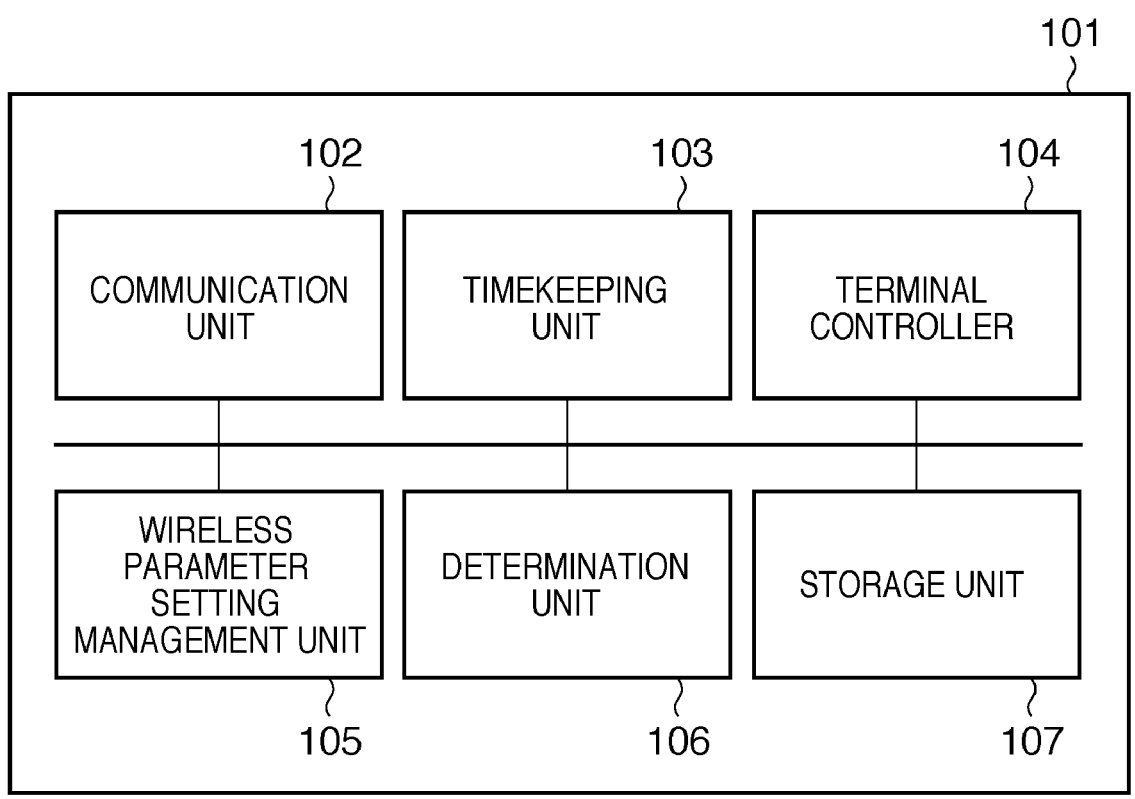
FIG. 1 is a block diagram illustrating an example of the configuration of a wireless LAN access point according to a first embodiment of the present invention.

First, reference will be had to FIG. 1 to describe the configuration of a wireless LAN access point in a wireless LAN system serving as one example of a wireless communication system.

FIG. 1 is a block diagram illustrating an example of the configuration of a wireless LAN access point according to a first embodiment of the present invention. As illustrated in FIG. 1, a wireless LAN access point 101 includes a communication unit 102, a timekeeping unit 103, a terminal controller 104, a wireless parameter setting management unit 105, a determination unit 106 and a storage unit 107.

The communication unit 102 has a function for performing wireless communication with a plurality of wireless terminals (stations) via an antenna, not shown. The timekeeping unit 103, which has a timer capable of being set by the terminal controller 104, executes timekeeping processing using the set timer. The terminal controller 104 exercises overall control of the wireless LAN access point 101. The wireless parameter setting management unit 105 executes processing such as processing for transmitting a wireless parameter to a wireless terminal, processing for transmitting a setting change request for effecting a return to its own network, and processing for changing a wireless parameter of the wireless LAN access point 101. The determination unit 106 determines the status of traffic of a wireless terminal connected to the wireless LAN. The storage unit 107 stores wireless parameters, etc., set when the network is constructed.

Figure 2:
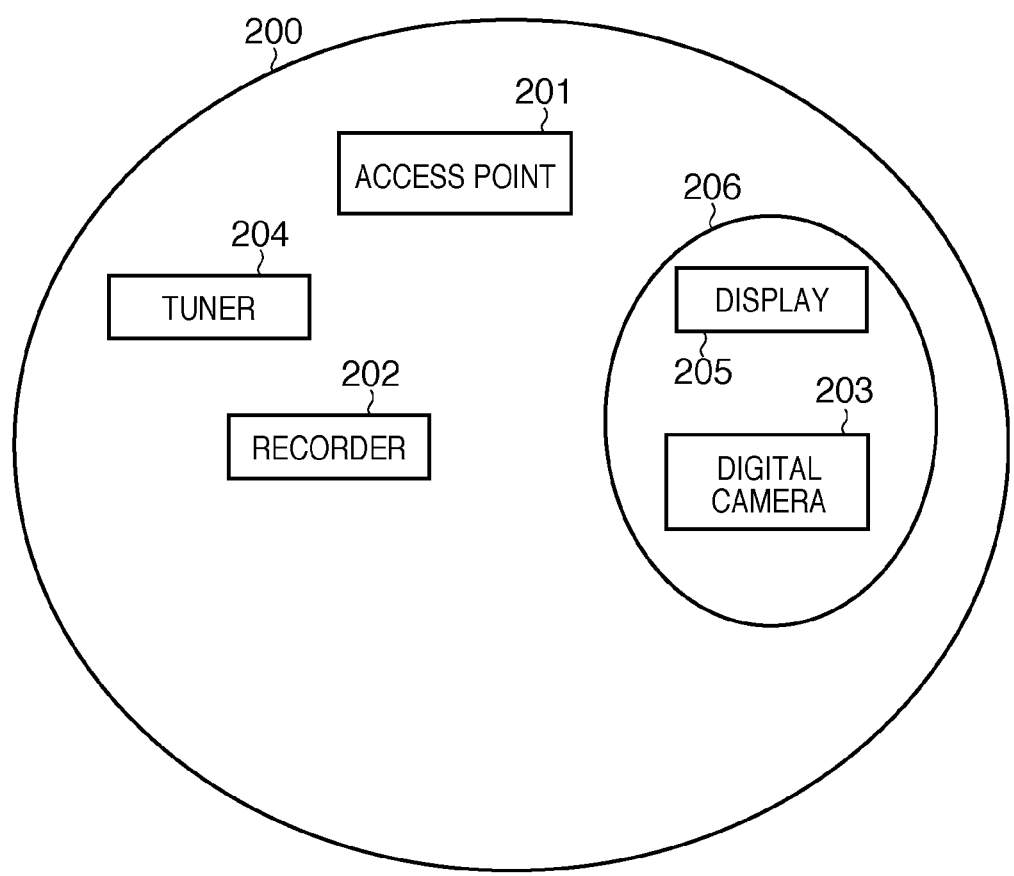
FIG. 2 is a diagram illustrating an example of the configuration of a wireless LAN system in the first embodiment.

FIG. 2 is a diagram illustrating an example of the configuration of the wireless LAN system in the first embodiment. As shown in FIG. 2, an access point 201 corresponding to the wireless LAN access point 101 shown in FIG. 1 constructs a network 200 in the infrastructure mode. A plurality of wireless terminals (a recorder 202, digital camera 203, tuner 204 and display 205) each having a wireless communication function is adapted so as to be capable of wireless communication via the access point 201.

The access point 201 has a relay function for wireless communication with the plurality of wireless terminals and functions for changing, accepting and storing wireless parameters, and each wireless terminal has functions for changing, accepting and storing wireless parameters. It should be noted that the wireless terminal display 205 is a dual terminal having the function of an access point in addition to the above-mentioned functions.

Described next is processing in which a specific wireless terminal constructs another network and starts wireless communication, after which the access point 201 requests a wireless terminal to return the specific wireless terminal to the network 200. In the example shown in FIG. 2, the specific wireless terminal is the display 205 and the wireless terminal is the recorder 202. Further, the other network is a network 206 composed of the display 205 and digital camera 203.

It should be noted that the network 206 in the first embodiment may be a network in either the infrastructure mode or ad-hoc mode.

Further, in this embodiment, the access point 201 is a communication apparatus that has a management function for managing the network and provides a relay function and wireless communication function, etc., with respect to the plurality of wireless terminals.

Figure 3:
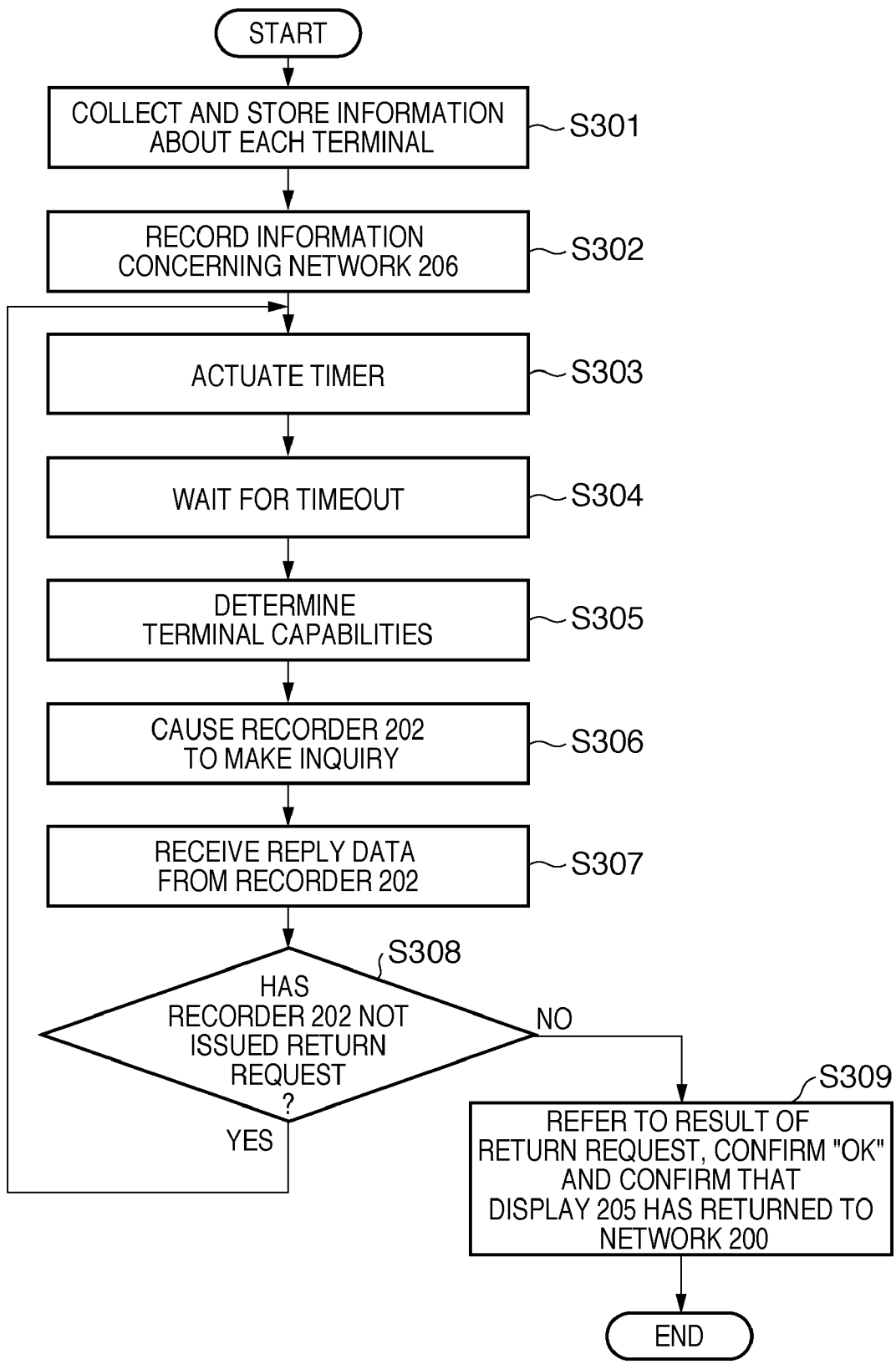
FIG. 3 is a flowchart illustrating processing for returning a wireless terminal in the first embodiment.

FIG. 3 is a flowchart illustrating processing for returning a wireless terminal according to the first embodiment. First, the terminal controller 104 of the access point 201 collects terminal information from the recorder 202, digital camera 203, tuner 204 and display 205, which are connected to the network 200, via the communication unit 102 and stores this information in the storage unit 107 (S301). Next, the terminal controller 104 stores wireless-parameter settings information, which has been set with the digital camera 203, in the storage unit 107 when the display 205 constructs the network 206 (S302).

Next, the terminal controller 104 instructs the timekeeping unit 103 to actuate the timer (S303) and waits for timeout reported from the timekeeping unit 103 upon elapse of a fixed period of time (S304). Upon receiving notification of timeout from the timekeeping unit 103, the terminal controller 104 judges the terminal capabilities of the wireless terminals connected to the network 200 and decides the wireless terminal to be connected to the network 206 (S305). In this example, the terminal controller 104 decides which of the recorder 202 or tuner 204 is to be allowed to join the network 206 based upon certain criteria, namely that the terminal is not currently communicating and will not begin high-priority communication even upon elapse of a certain period of time (e.g., that a communication-scheduling timer is not running).

Next, the terminal controller 104 delivers information concerning the network 206 and return-request instruction information to the wireless terminal (the recorder 202 in this example) corresponding to the above-mentioned criteria and causes it to make an inquiry (S306). The querying will be described later with reference to FIG. 4. Next, the terminal controller 104 receives return-request reply data from the recorder 202 (S307) and determines whether the recorder 202 has issued a return request to the display 205 (S308). If the result of the determination is that the recorder 202 has not issued the return request to the display 205, then the terminal controller 104 returns control to S303 and repeats the above-described processing.

On the other hand, if is determined at S308 that the recorder 202 has issued the return request to the display 205, then control proceeds to step S309. Here the terminal controller 104 refers to the result of the reply data from the recorder 202, namely the reply to the request for return of the display 205. If the result is "OK", the terminal controller 104 confirms that the display 205 has returned to the network 200.

Figure 4:
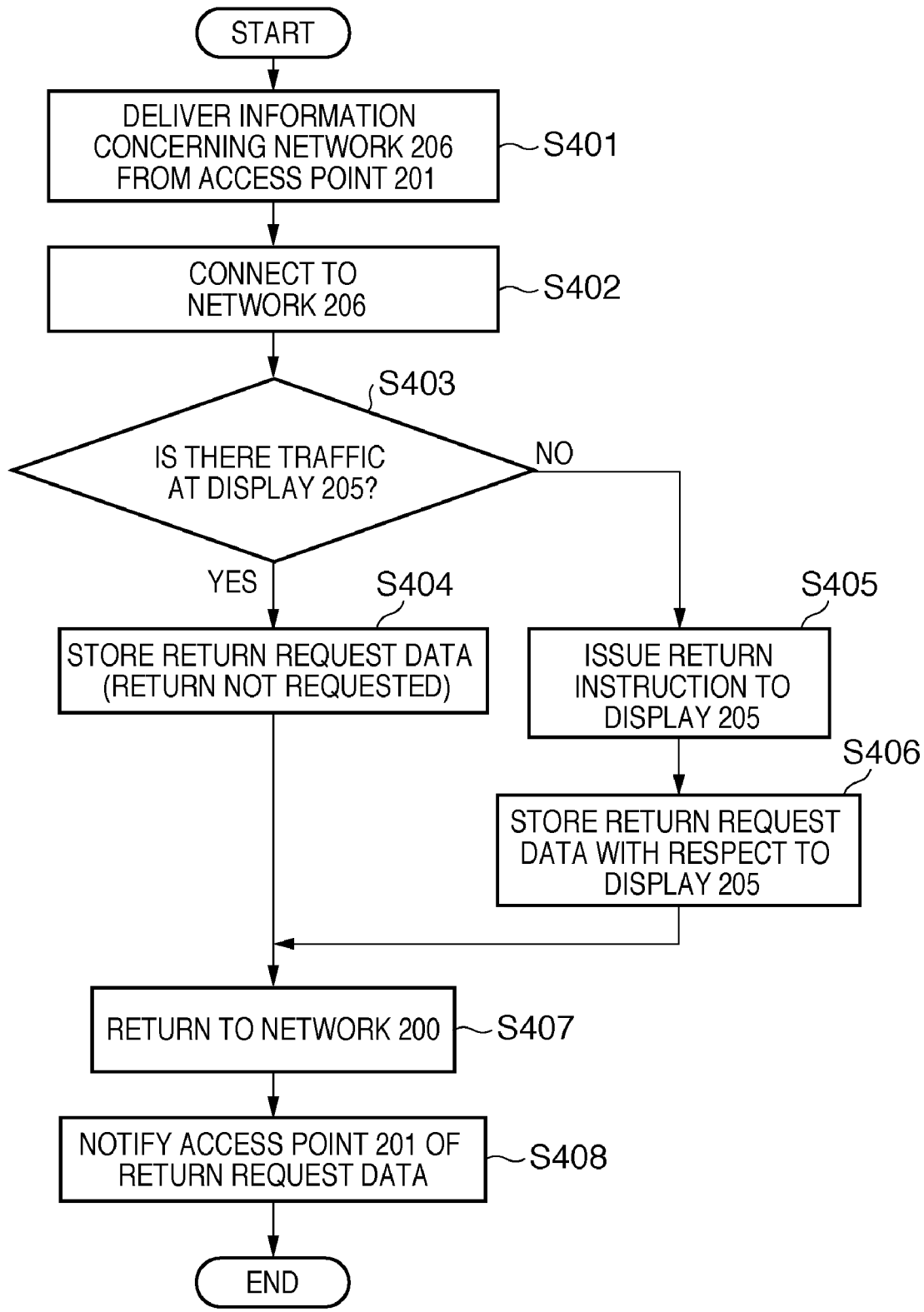
FIG. 4 is a flowchart illustrating return request processing executed by a wireless terminal in the first embodiment.

FIG. 4 is a flowchart illustrating return request processing executed by a wireless terminal in the first embodiment. In this example, the recorder 202 causes the display 205 to return to the network 200 in accordance with a return request from the access point 201.

First, the recorder 202 is delivered the information of network 206 and return-request instruction information from the access point 201 (S401). As a result, the recorder 202 is connected to the network 206 (S402) and the communication status of network 206 is determined (S403). Specifically, it is determined whether there is traffic at the display 205 in network 206. If the result of the determination is that there is traffic at the display 205, then control proceeds to step S404. In the step S404, the fact that a return instruction has not been issued is stored as return request data (i.e., whether or not return has been requested and the reply to the request for return of the display 205).

On the other hand, if it is found at S403 that there is no traffic at the display 205, then the recorder 202 issues the return instruction to the display 205 (S405). The recorder 202 then stores the fact that the return instruction has been issued to the display 205 and the result of the reply to the request for return of the display 205 as the return request data (i.e., whether or not return has been requested and the reply to the request for return of the display 205) (S406).

Next, the recorder 202 returns to the network 200 based upon the information of network 200 that is being held (S407). The recorder 202 notifies the access point 201 of the return request data (i.e., whether or not return has been requested and the reply to the request for return of the display 205) (S408). This processing is then exited.

Figure 5:
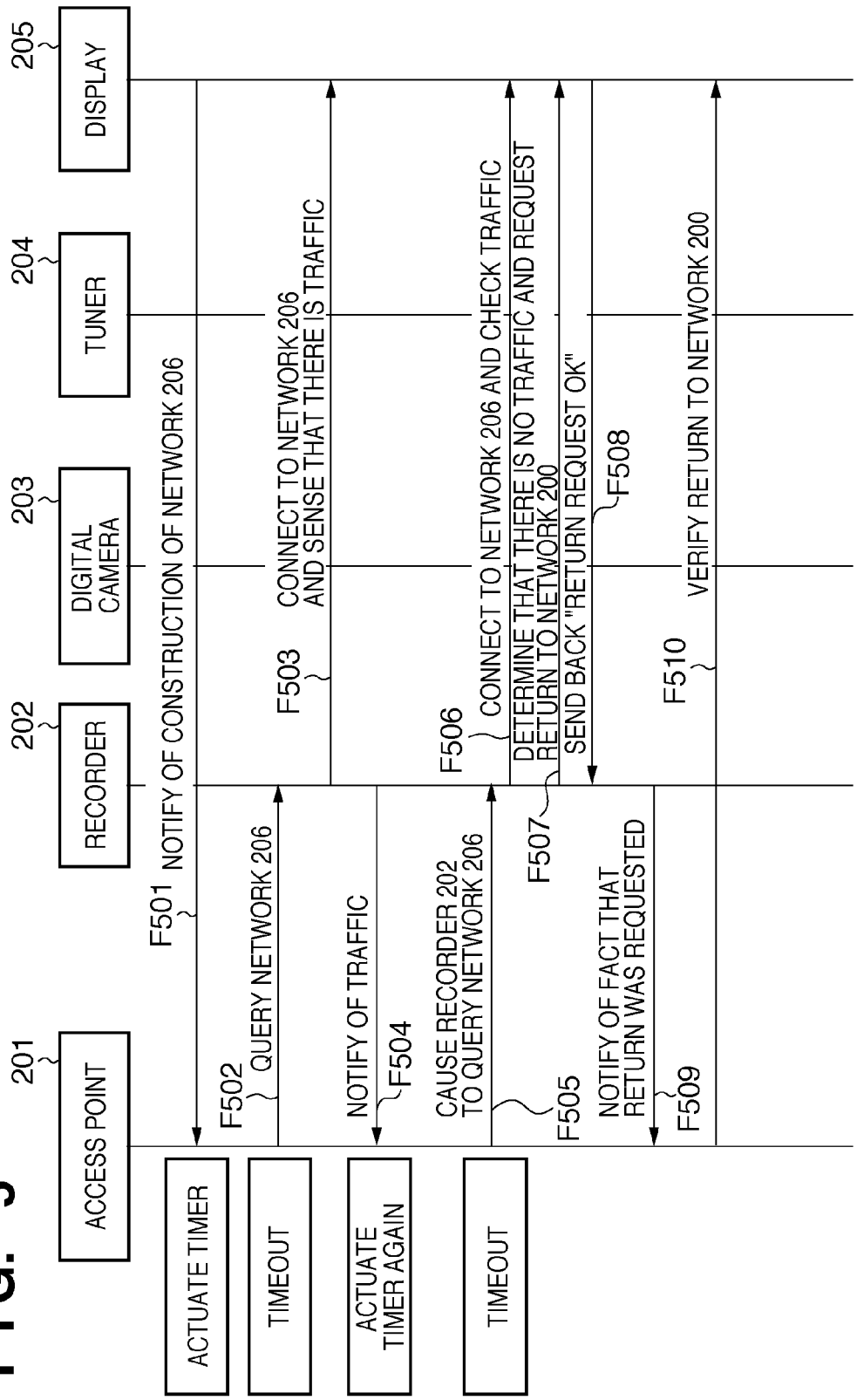
FIG. 5 is a diagram illustrating a sequence for returning a wireless terminal in the first embodiment.

FIG. 5 is a diagram illustrating a sequence for returning a wireless terminal according to the first embodiment. The access point 201 accepts notification from the display 205 to the effect that the network 206 will be constructed (F501). In response, the terminal controller 104 of the access point 201 starts the timer of the timekeeping unit 103. When the timer times out, the terminal controller 104 notifies the recorder 202, which has been selected by the above-mentioned criteria, to query the network 206 (F502).

Next, as mentioned above, the recorder 202 is connected to the network 206 and checks the traffic at the display 205 (F503). If the recorder 202 senses traffic, it notifies the access point 201 of the presence of traffic and the terminal controller 104 starts the timer again (F504). When the timer of the timekeeping unit 103 subsequently times out, the terminal controller 104 notifies the recorder 202 to query the network 206 (F505).

Next, the recorder 202 is connected to the network 206 and checks the traffic at the display 205 (F506). If the recorder 202 determines that there is no traffic at the display 205, then it issues a return request instruction to the display 205 so as to effect a return to the network 200 (F507). When the display 205 acknowledges the return request, the recorder 202 stores this acknowledgement (F508).

Next, the recorder 202 notifies the access point 201 of the fact that the display 205 was requested to return and of the reply of the display 205 to the return request (F509). In response, the access point 201 verifies that the display 205 has returned to the network 200 (F510).

Thus, after the display 205 constructs the network 206, the recorder 202 is allowed to join the network 206 and requests the display 205 to return, thereby enabling the display 205 to be returned to the network 200.

It should be noted that the object allowed to return to the network 200 is not limited to the display 205 and may just as well be the digital camera 203 which also exists in the network 206.

Further, although an example has been described in which the recorder 202 is the wireless terminal that issues the return request instruction, this may just as well be the tuner 204.

Second Embodiment

Next, a second embodiment according to the present invention will be described in detail with reference to the drawings. In the second embodiment, processing in a case where the display 205 refuses the return request from the recorder 202 in the arrangement of the first embodiment will be described.

The configurations of the access point and wireless LAN system in the second embodiment are the same as those in FIGS. 1 and 2 described in the first embodiment. Further, the return request processing by the wireless terminal is the same as that of FIG. 4 described in the first embodiment.

Figure 6:
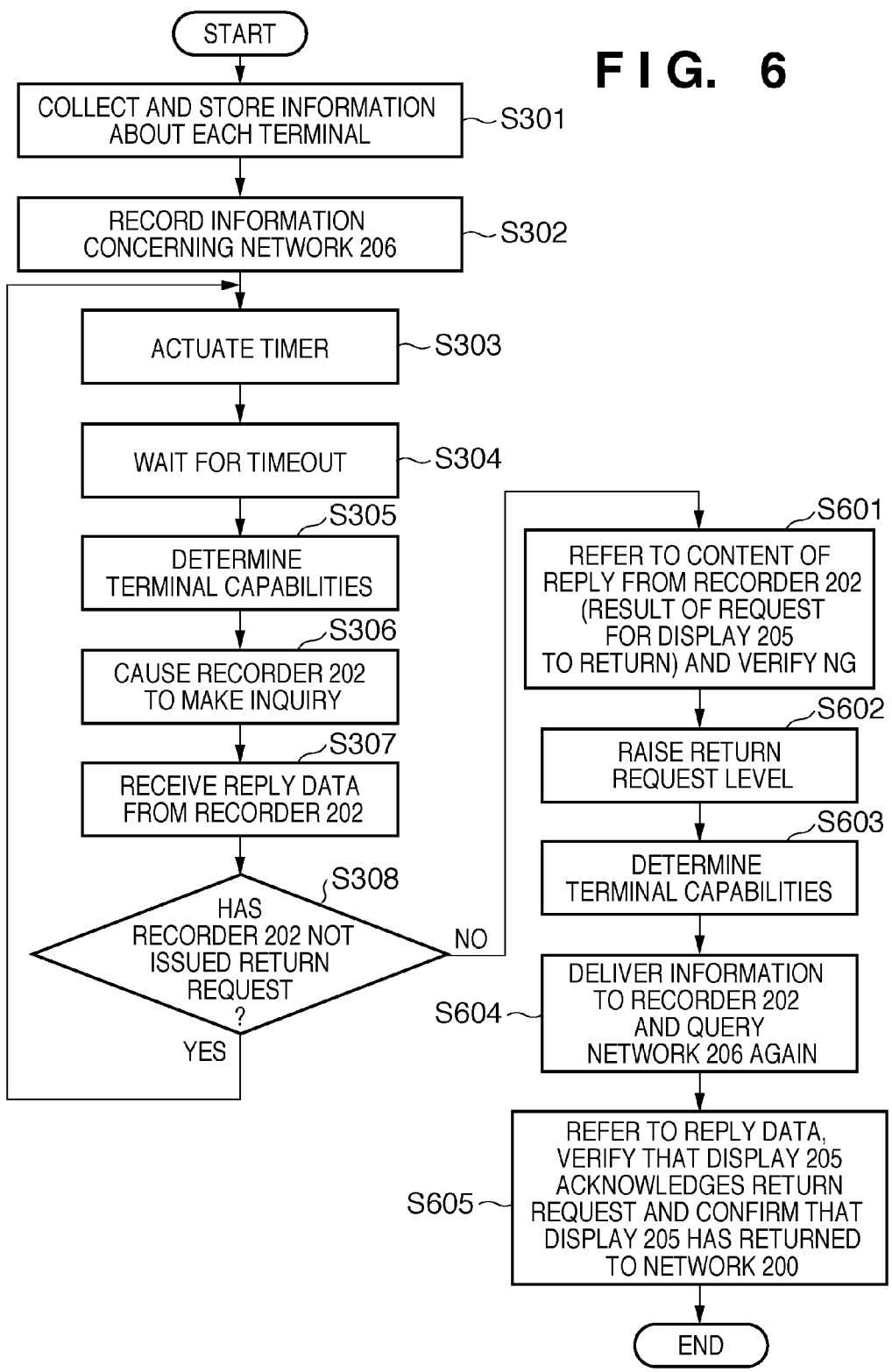
FIG. 6 is a flowchart illustrating processing for returning a wireless terminal in a second embodiment of the present invention.

FIG. 6 is a flowchart illustrating processing for returning a wireless terminal according to the second embodiment. The processing of steps S301 to S308 in FIG. 6 is the same as that of the first embodiment and need not be described again.

If it is determined at S308 that the recorder 202 has issued the return request to the display 205, then the terminal controller 104 advances control to S601. Here the terminal controller 104 refers to the reply received from the recorder 202 with regard to the request to return the display 205 and verifies failure (NG) (S601). In response, the terminal controller 104 raises the level of the return request instruction (S602).

In a manner similar to that at step S305, the terminal controller 104 judges the terminal capabilities of the wireless terminals connected to the network 200 and decides the wireless terminal to be connected to the network 206 (S603). Next, the terminal controller 104 delivers the information of the network 206 and return request instruction information to the wireless terminal (the recorder 202 in this example) corresponding to the above-mentioned criteria and causes it to perform the inquiry again (S604). Based upon the return request data of the recorder 202, the terminal controller 104 verifies that the display 205 has responded to the return request of the recorder 202 and confirms that the display 205 has returned to the network 200 (S605). Here whether or not the recorder 202 issued the return request and the result of the reply to the request for the return of the display 205 are the return request data.

Figure 7:
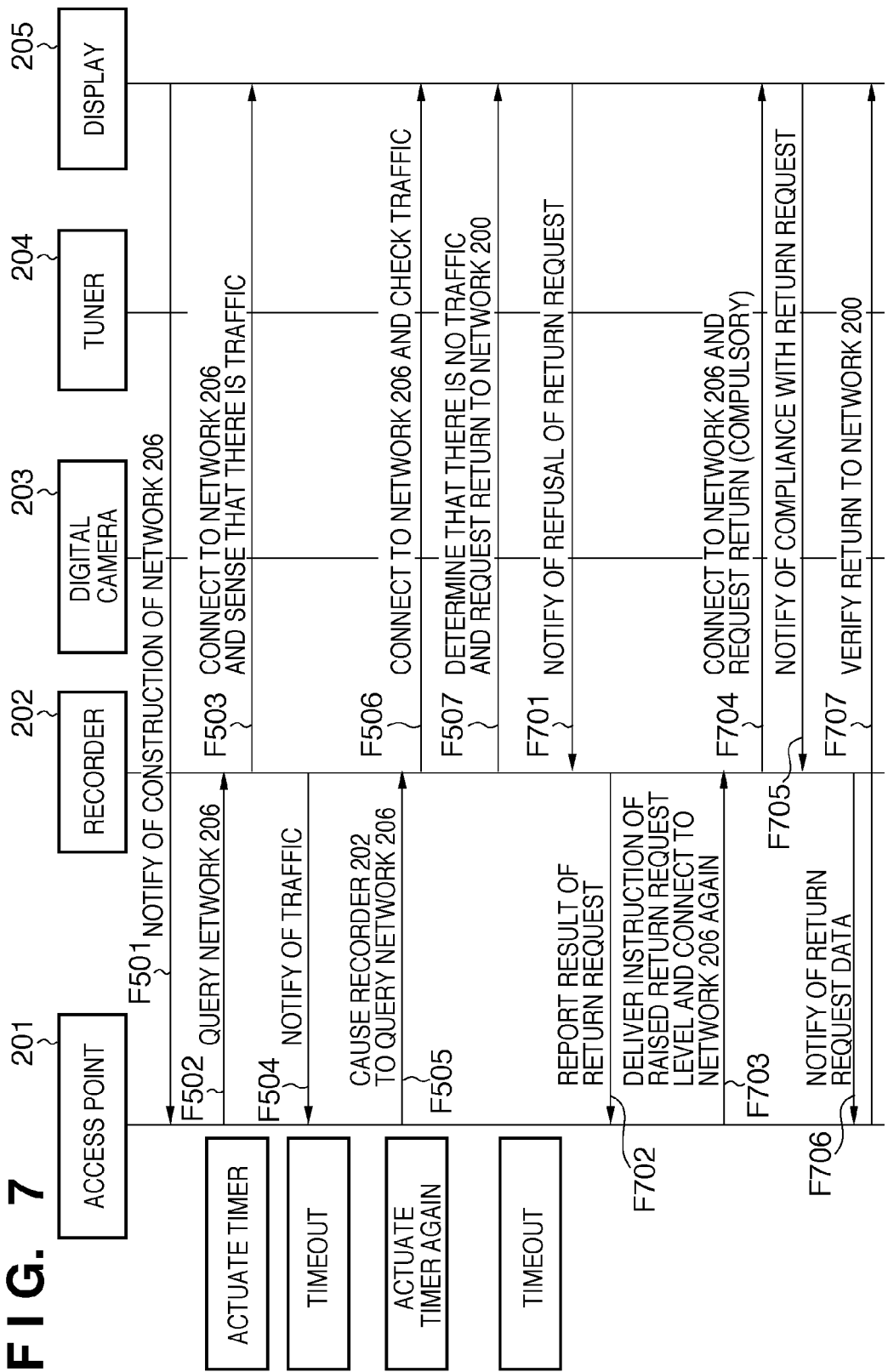
FIG. 7 is a diagram illustrating a sequence for returning a wireless terminal in the second embodiment.

FIG. 7 is a diagram illustrating a sequence for returning a wireless terminal according to the second embodiment. Here F501 to F507 are similar to F501 to F507 shown in FIG. 5 described in the first embodiment and need not be described again.

Upon receiving a return request refusal message from the display 205 (F701), the recorder 202 notifies the access point 201 of the result of the return request (F702).

The terminal controller 104 of the access point 201 delivers the return instruction the return instruction level of which has been raised and the information concerning network 206 to the recorder 202 decided based upon the above-mentioned criteria and causes it to query the network 206 again (F703).

Next, the recorder 202 accesses the network 206 using this information and issues the return instruction (compulsory) to the display 205 so as to return it to the network 200 (F704). Upon receiving from the display 205 a message in compliance with the return request (F705), the recorder 202 sends return request data (whether or not return was requested and the result of the reply to the request that the display 205 return) to the access point 201 (F706). In response, the access point 201 confirms that the display 205 has returned to the network 200 (F707).

Thus, even if a return request is refused once by the display 205 that exists in the network 206, the display 205 can be returned to the network 200 by raising the level of the return request instruction and issuing the return request again.

It should be noted that the object allowed to return to the network 200 is not limited to the display 205 and may just as well be the digital camera 203 which also exists in the network 206.

Further, although an example has been described in which the recorder 202 is the wireless terminal that issues the return request instruction, this may just as well be the tuner 204.

Third Embodiment

Next, a third embodiment according to the present invention will be described in detail with reference to the drawings. Described in the third embodiment is processing in which a wireless terminal having a function similar to that of a wireless terminal to be returned to a network is caused to issue a return request.

Figure 8:
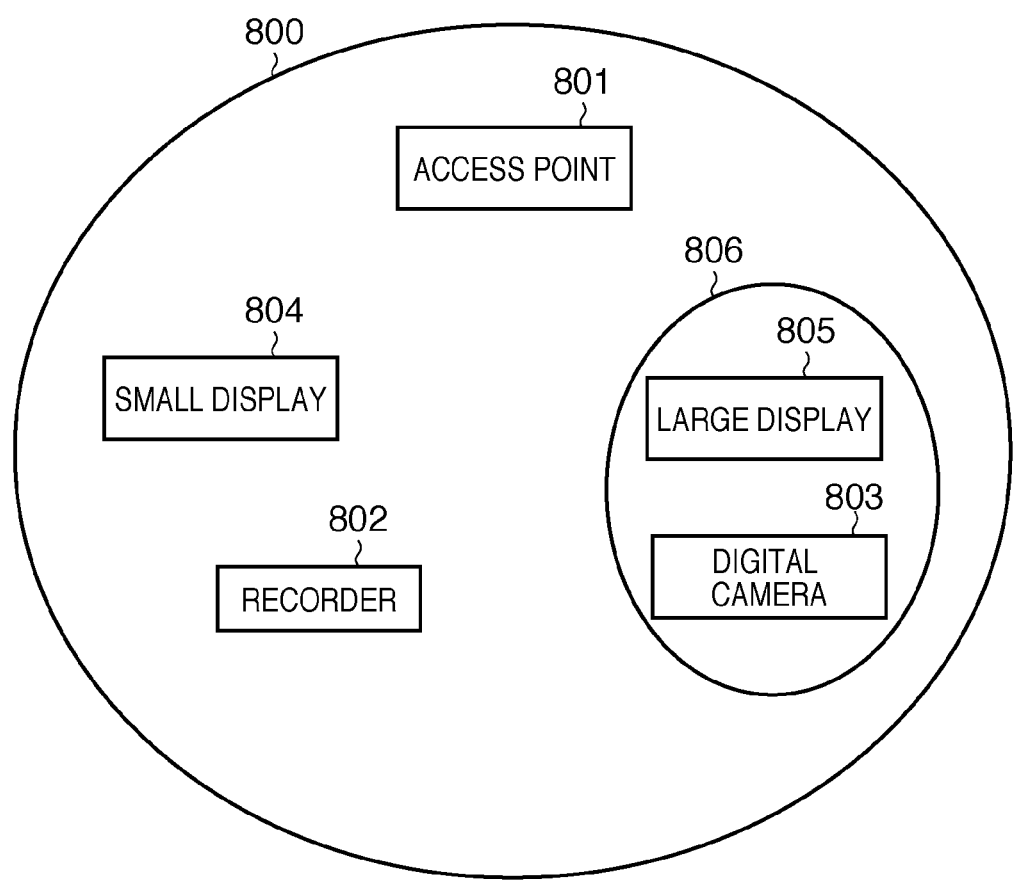
FIG. 8 is a diagram illustrating an example of the configuration of a wireless LAN system in a third embodiment of the present invention.

FIG. 8 is a diagram illustrating an example of the configuration of a wireless LAN system according to a third embodiment. An access point 801 shown in FIG. 8 has functions similar to those of the access point 201 described in the first embodiment. Further, as in the first embodiment, it is so arranged that a plurality of wireless terminals (recorder 802, digital camera 803, small display 804 and large display 805) each having a communication function are capable of performing wireless communication via the access point 801.

The small display 804 is a dual terminal having a function identical with that of the large display 805 and the function of an access point as well. Further, the configurations of the access point 801 and other wireless terminals are similar to those of the first embodiment and need not be described in detail again.

Described next is processing in which a specific wireless terminal constructs another network and starts wireless communication, after which the access point 801 causes a wireless terminal that can be substituted for the specific wireless terminal to join the other network and causes the specific wireless terminal to return to the network 800. In the example depicted in FIG. 8, the specific wireless terminal is the large display 805 and the wireless terminal is the small display 804. Further, the other network is a network 806 composed of the large display 805 and digital camera 803.

Figure 9:
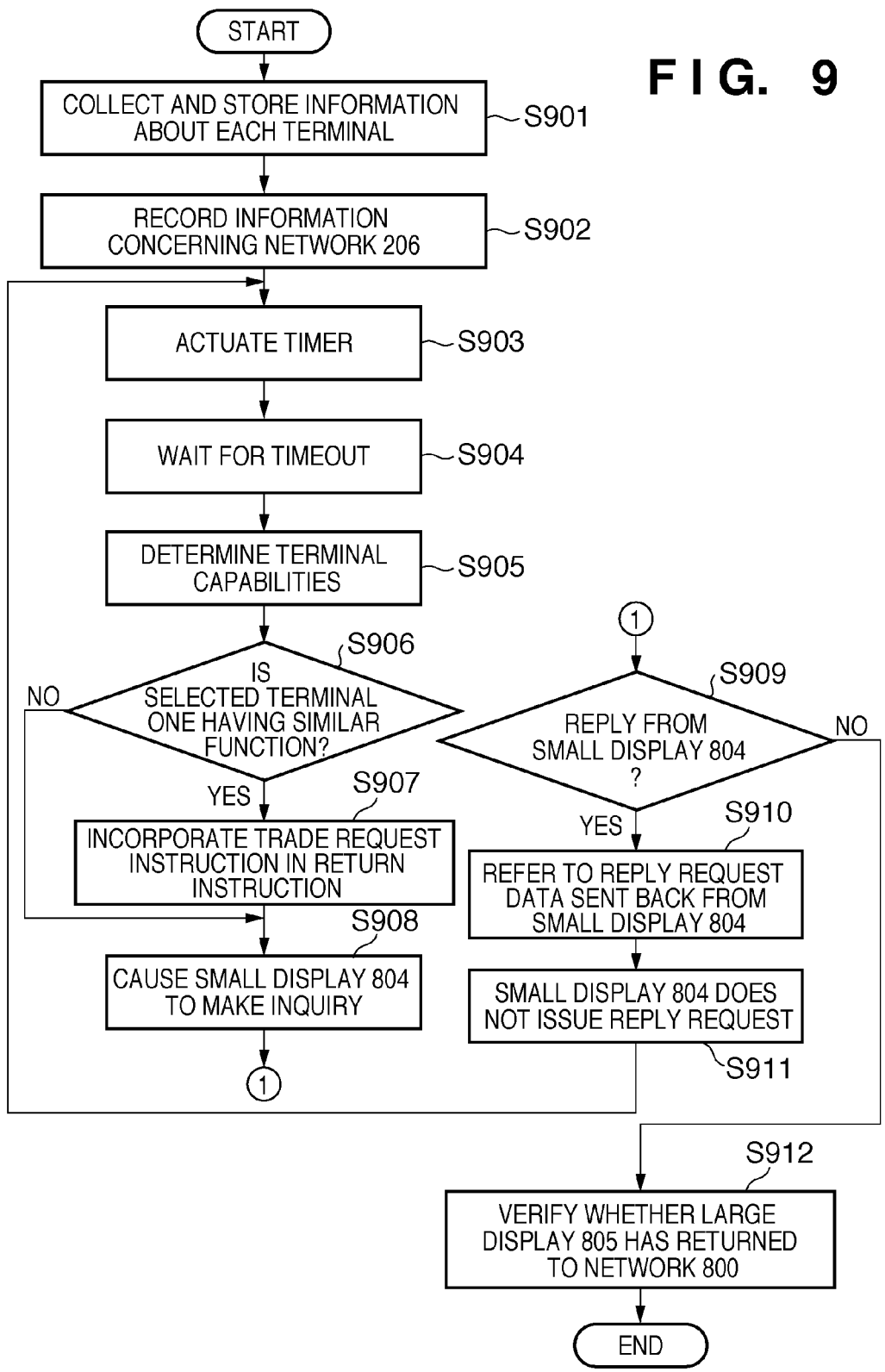
FIG. 9 is a flowchart illustrating processing for returning a wireless terminal in the third embodiment.

FIG. 9 is a flowchart illustrating processing for returning a wireless terminal according to the third embodiment. First, the access point 801 collects and stores terminal information from the plurality of terminals of network 800 (S901). Next, the access point 801 stores wireless-parameter settings information, which has been set with the digital camera 803, when the large display 805 constructs the network 806 (S902).

Next, the access point 801 actuates the timer (S903). When the access point 801 is notified of timeout (S904), the access point 801 judges the terminal capabilities of the wireless terminals connected to the network 800 and decides the wireless terminal to be connected to the network 806 (S905). That is, the access point 801 decides upon the recorder 802 or small display 804 based upon certain criteria, namely that the terminal is not currently communicating and will not begin high-priority communication even upon elapse of a certain period of time (that a communication-scheduling timer is not running) or that the display has a function similar to that of the large display 805.

Next, the access point 801 determines whether the wireless terminal corresponding to the above-described criteria has a function similar to that of the large display 805 (S906). If the small display 804 having the similar function has been selected, then the access point 801 adds a trade request instruction (which disables refusal of the large display 805) onto the return request instruction (S907). If the recorder 802 has been selected ("NO" at S906), then control proceeds to S908.

Next, the access point 801 delivers information concerning the network 806 and return instruction to the selected wireless terminal (here the small display 804) and causes it to query the large display 805 of network 806 (S908). Next, the access point 801 determines whether return request data (whether or not return has been requested and the reply to the request for return of the large display 805) has been sent back from the small display 804 (S909). If return request data is sent back from the small display 804, then the access point 801 checks the content of the reply (S910).

Next, the access point 801 determines from the return request data sent back from the small display 804 that the small display 804 has not issued the return request to the large display 805, returns processing to S903 and repeats the above-described processing (S911).

On the other hand, if it is determined at S909 that return request data has not been sent back from the small display 804, then the access point 801 verifies whether the large display 805 has returned to the network 800 (S912).

Described next will be processing by a wireless terminal (the small display 804) that has received a return request from the access point 801 to return the large display 805 to the network 800.

Figure 10:
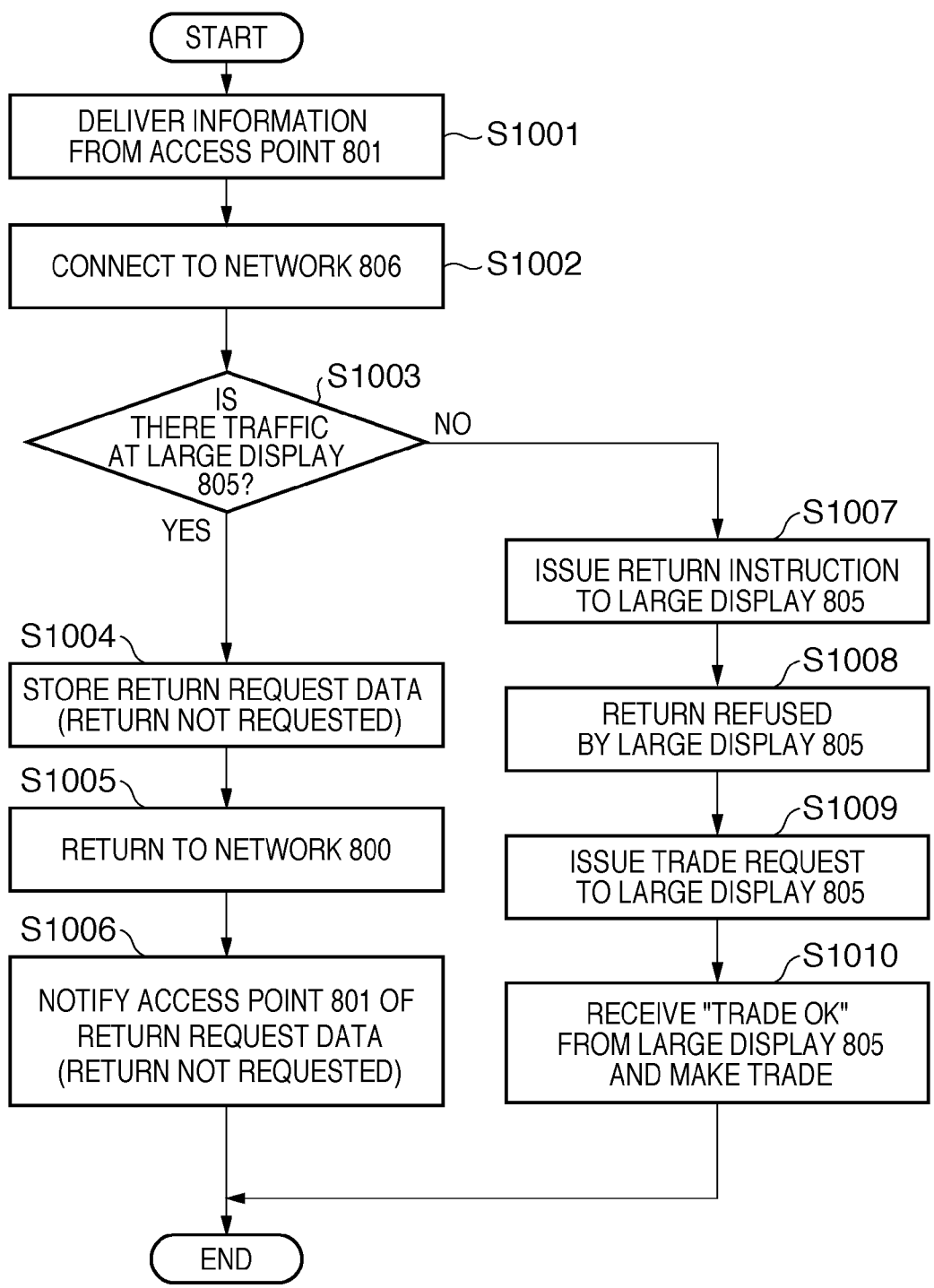
FIG. 10 is a flowchart illustrating return request processing executed by a wireless terminal in the third embodiment.

FIG. 10 is a flowchart illustrating return request processing executed by a wireless terminal in the third embodiment. In this example, the small display 804, in accordance with a return request from the access point 801, issues a trade request to the large display 805 in order to return the large display 805 to the network 800.

First, the small display 804 is delivered the information of network 806 and the return request instruction information from the access point 801 (S1001). As a result, the small display 804 is connected to the network 806 (S1002) and whether there is traffic at the large display 805 in network 806 is determined (S1003). If the result of the determination is that there is traffic at the large display 805, then control proceeds to S1004.

At S1004, the fact that a return instruction has not been issued is stored as return request data (i.e., whether or not return has been requested and the reply to the request for return of the large display 805). The small display 804 returns to the network 800 (S1005) and notifies the access point 801 of the return request data indicating that a return request has not been issued (S1006).

On the other hand, if it is found at S1003 that there is no traffic at the large display 805, then the small display 804 issues the return instruction to the large display 805 (S1007). If the large display 805 refuses the return request from the small display 804 (S1008), then the small display 804 issues a trade request to the large display 805 (S1009). The trade request is one that requests interchange of the small display 804 and large display 805. If "trade OK" is received from the large display 805 in response to the trade request, then the small display 804 makes the trade (S1010) and terminates processing.

Figure 11:
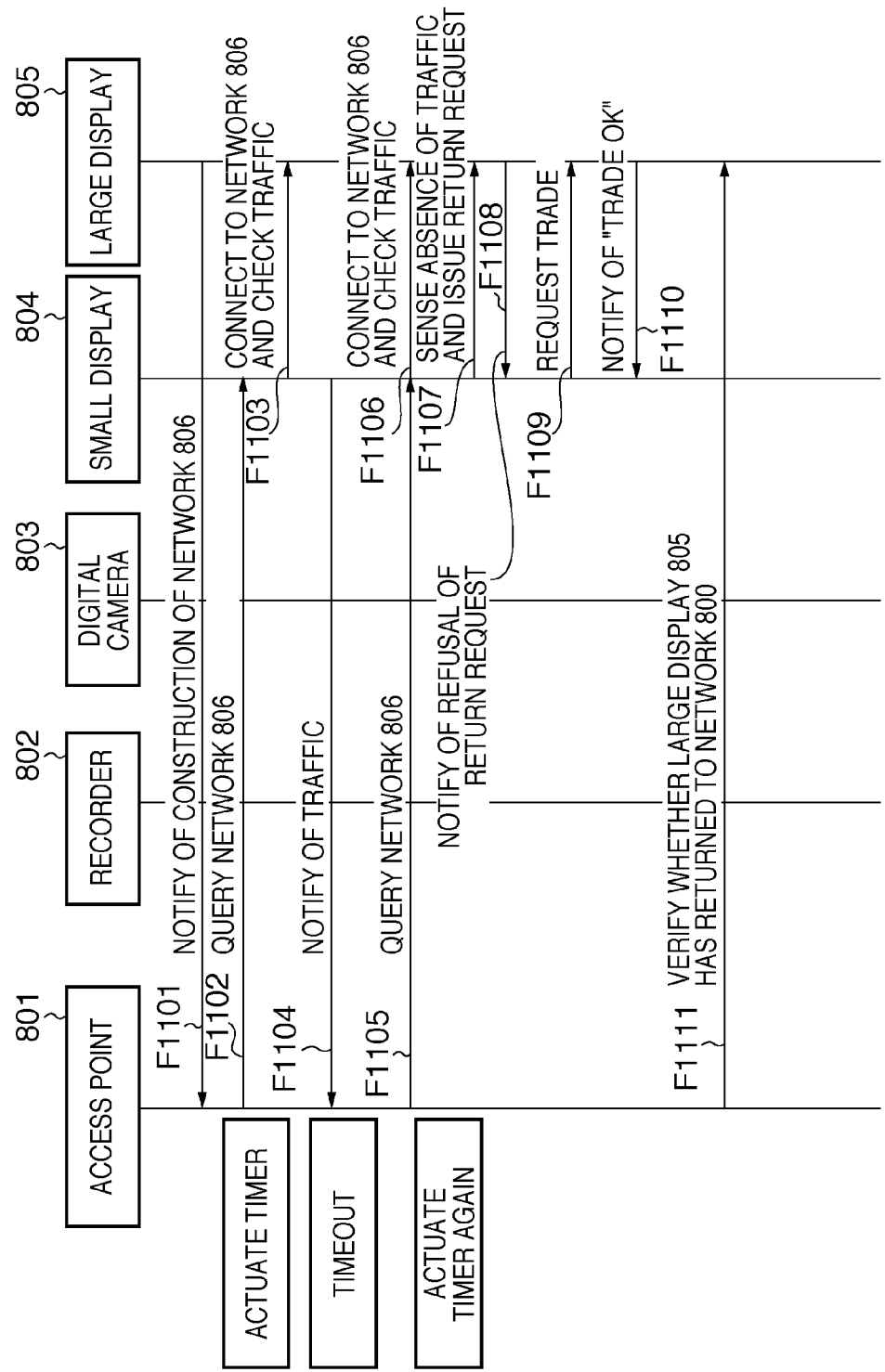
FIG. 11 is a diagram illustrating a sequence for returning a wireless terminal in the third embodiment.

FIG. 11 is a diagram illustrating a sequence for returning a wireless terminal according to the third embodiment. The access point 801 accepts notification from the large display 805 to the effect that the network 806 will be constructed (F1101). In response, the access point 801 starts the timer. When the timer times out, the access point 801 notifies the small display 804 to query the network 806 (F1102).

Next, the small display 804 queries the large display 805 and checks the traffic at the large display 805 (F1103). The small display 804 notifies the access point 801 that there is traffic at the large display 805, and the access point 801 starts the timer again (F1104). When the timer of the access point 801 subsequently times out, the access point 801 notifies the small display 804 to query the network 806 (F11005).

Next, the small display 804 queries the large display 805 and checks the traffic at the large display 805 (F1106). The small display 804 senses that there is no traffic at the large display 805 and notifies the large display 805 to return to the network 800 (F1107). When the large display 805 refuses this return request (F1108), the small display 804 notifies the large display 805 to trade (F1109).

Next, when the small display 804 receives a "trade OK" notification from the large display 805, the trade is made (F1110). Thereafter, the access point 801 senses that the small display 804 does not return to the network 800 and checks to determine whether the large display 805 has returned to the network 800 (F1111).

Thus, even if a return request from the small display 804 is refused by the large display 805, the small display 804 issues the trade request to the large display 805, whereby the large display 805 can be returned to the network 800.

Fourth Embodiment

Next, a fourth embodiment according to the present invention will be described in detail with reference to the drawings. In the fourth embodiment, return processing in a state that is a combination of the first to third embodiments will be described.

It should be noted that the configuration of the wireless LAN system in the fourth embodiment is the same as that shown in FIG. 8 and need not be described again.

The fourth embodiment is such that when the recorder 802 is made to issue a return request and the request is refused by the large display 805, the small display 804 is made to issue the return request. When the request is refused by the large display 805, the small display 804 issues a trade request and the large display 805 is caused to return to the network 800.

Figure 12A:
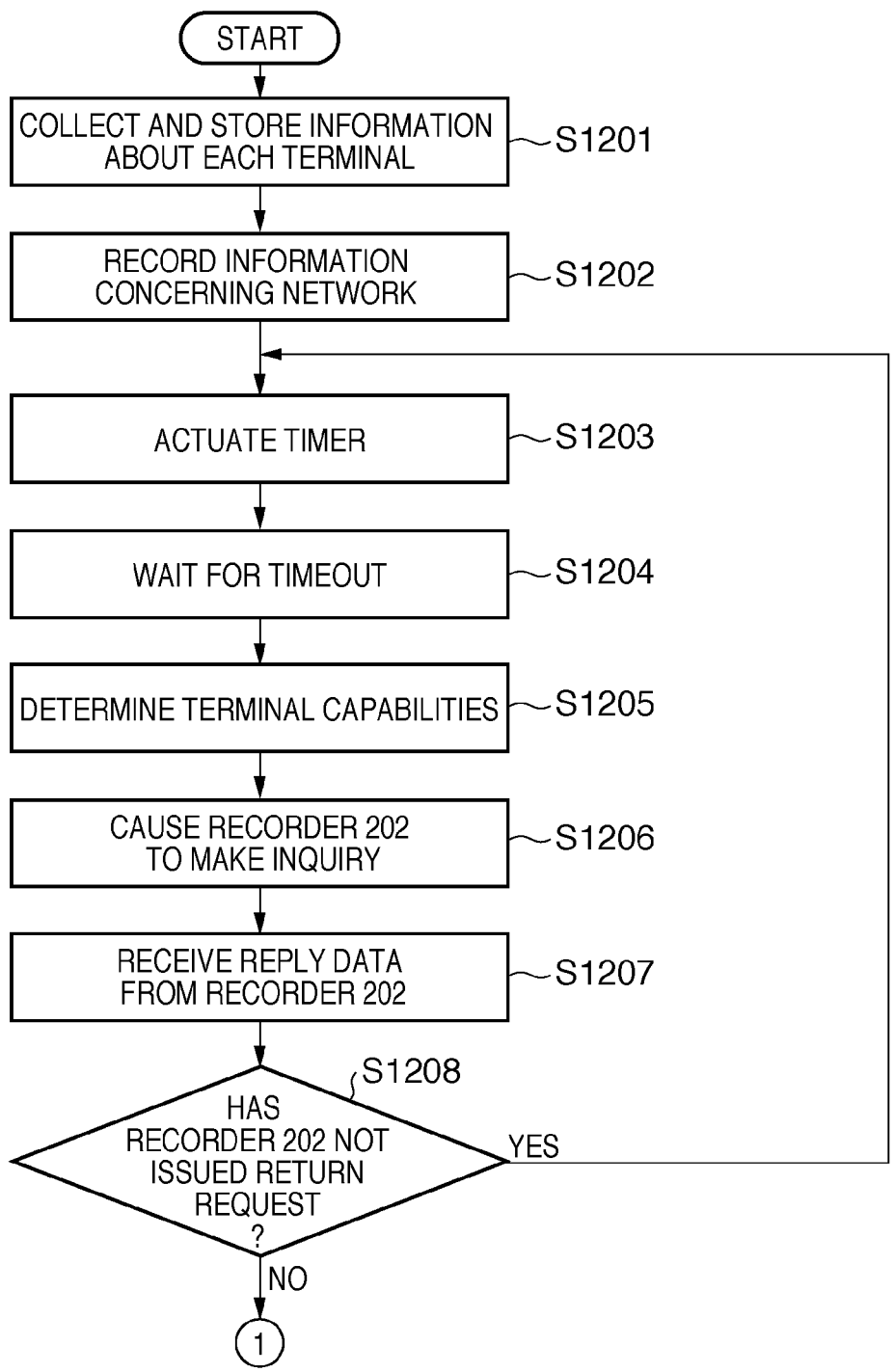
FIGS. 12A and 12B are flowcharts illustrating processing executed by an access point according to a fourth embodiment of the present invention.
Figure 12B:
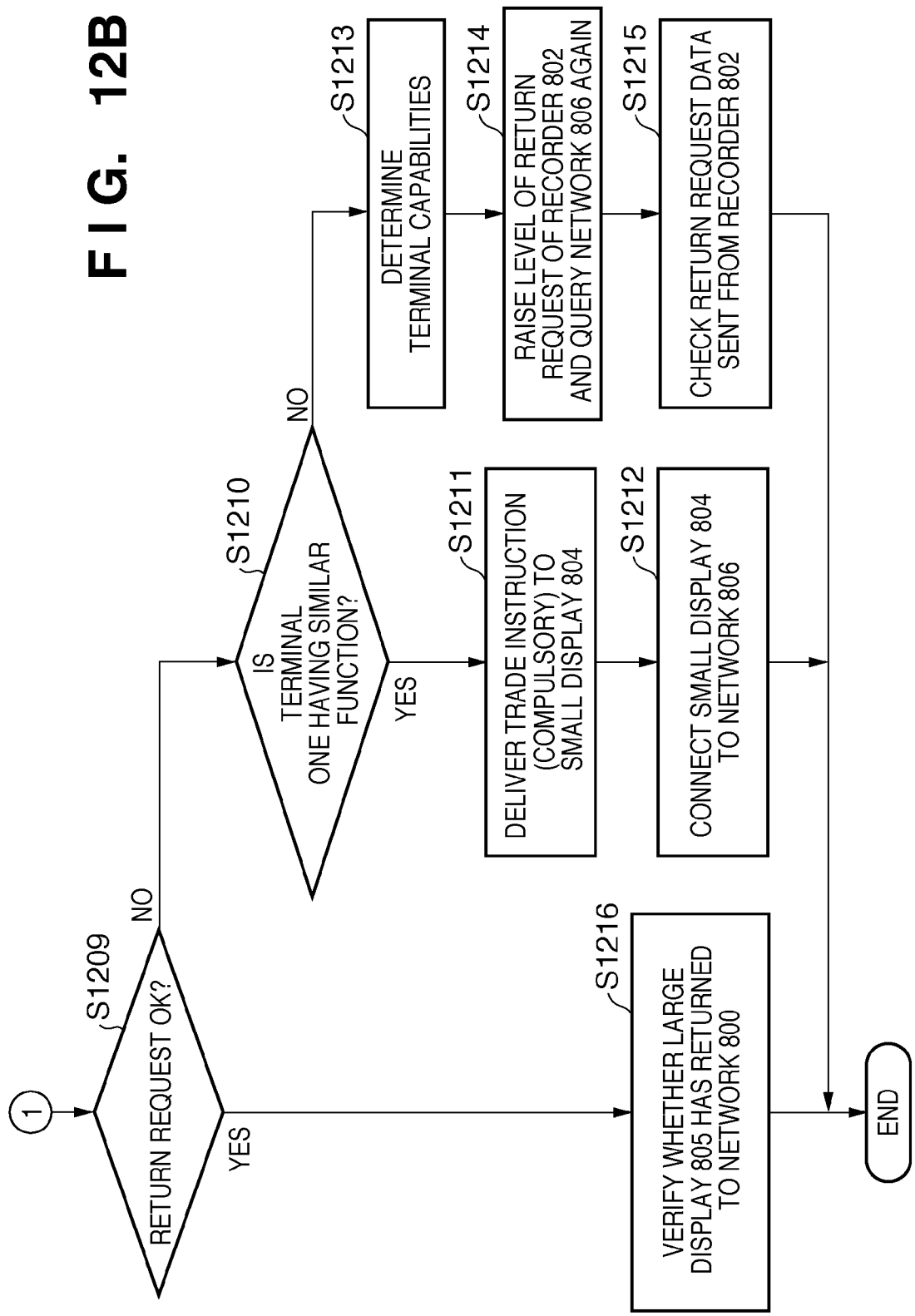

FIGS. 12A and 12B are flowcharts illustrating processing executed by the access point according to the fourth embodiment. First, the access point 801 collects and stores terminal information from the plurality of terminals of network 800 (S1201). Next, the access point 801 stores wireless-parameter settings information, which has been set with the digital camera 803, when the large display 805 constructs the network 806 (S1202).

Next, the access point 801 actuates the timer (S1203). When the access point 801 is notified of timeout (S1204), the access point 801 judges the terminal capabilities of the wireless terminals connected to the network 800 and decides the wireless terminal to be connected to the network 806 (S1205). In a manner similar to that of the third embodiment, either the recorder 802 or small display 804 is decided upon based on the above-mentioned criteria.

Next, the access point 801 delivers information concerning the network 806 and the return request instruction information to the wireless terminal (here the recorder 802) corresponding to the above-mentioned criteria and causes it to make an inquiry (S1206). Next, the access point 801 receives the return request data (whether or not return has been requested and the reply to the request for return of the large display 805) from the recorder 802 (S1207). If it is determined at S1208 that the recorder 802 has not issued the return request to the large display 805, then the access point 801 returns processing to S1203 and repeats the above-described processing.

On the other hand, the access point 801 refers to the return request data received from the recorder 802 and determines whether the large display 805 has complied with the return request from the recorder 802 (S1209). If the result of the determination is that the large display 805 has refused the return request, then it is determined whether a terminal having a function similar to that of the large display 805 exists on the network 800 (S1210). If the similar terminal exists, then the access point 801 delivers the information of the network 806 and the trade instruction information to the small display 804 (S1211). Then access point 801 then connects the small display 804 to large display 805 in the network 800 (S1212).

If it is found at S1210 that the small display 804 does not exist, then the access point 801 decides the wireless terminal that is to issue the return request based upon the above-mentioned criteria. Here the access point 801 delivers the return instruction, the return instruction level of which has been raised, to the recorder 802 and makes the connection to the large display 805 in the network 800 again (S1214). The access point 801 then checks the return request data (whether or not return was requested and the result of the reply to the request that the large display 805 return) sent from the recorder 802 (S1215).

Finally, if the large display 805 has complied with the return request at S1209 or the processing of either S1212 or S1215 has ended, the access point 801 verifies whether the large display 805 has returned to the network 800 (S1216).

Described next will be processing by a wireless terminal (the recorder 802) that has received a return request from the access point 801 to return the large display 805 to the network 800.

Figure 13:
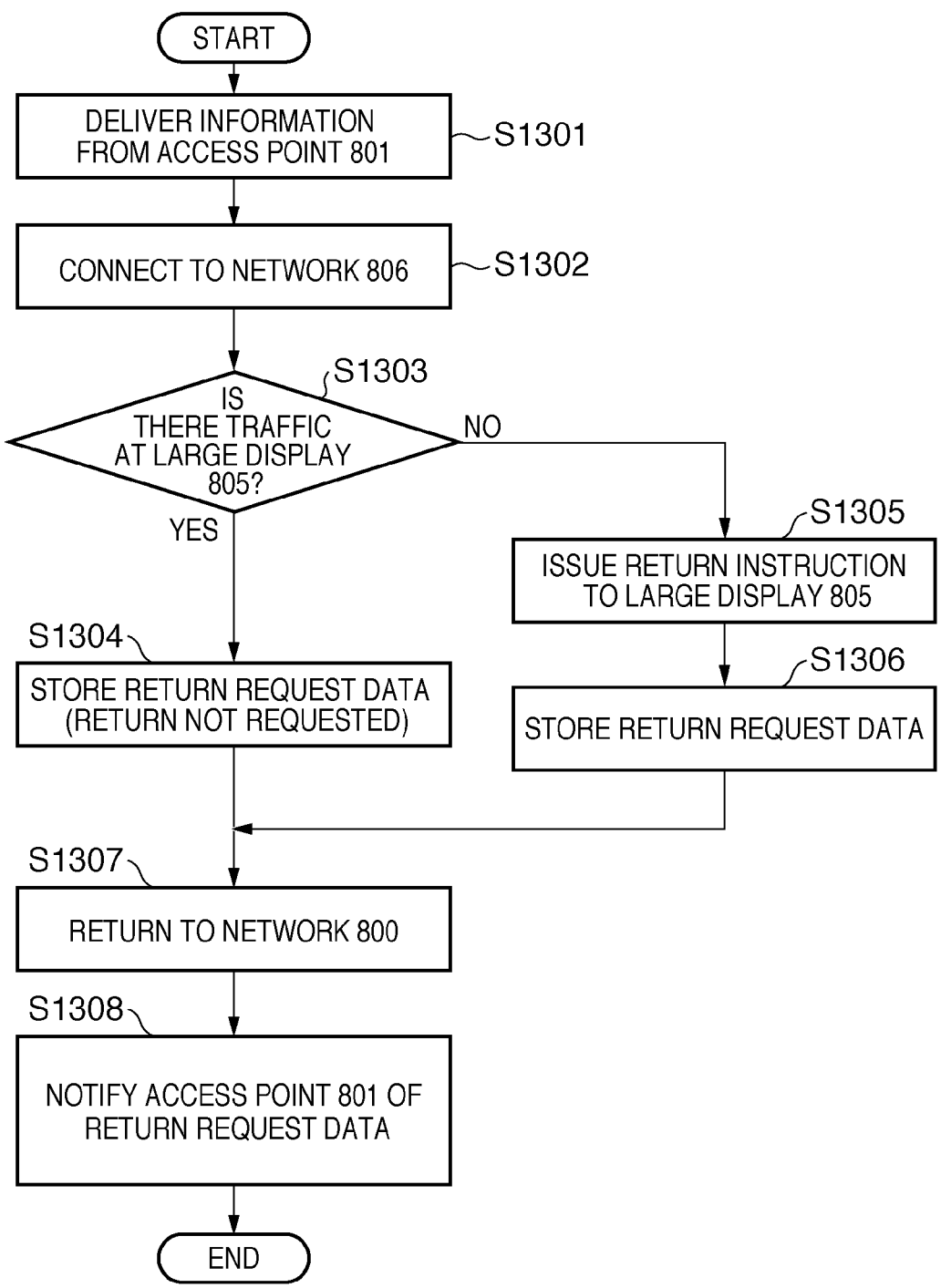
FIG. 13 is a flowchart illustrating return request processing executed by a wireless terminal in the fourth embodiment.

FIG. 13 is a flowchart illustrating return request processing executed by a wireless terminal in the fourth embodiment. In this example, processing in which the recorder 802 causes the large display 805 to return to the network 800 in accordance with a return request from the access point 801 will be described.

First, the recorder 802 is delivered the information of network 806 and the return request instruction information from the access point 801 (S1301). As a result, the recorder 802 is connected to the network 806 (S1302) and whether there is traffic at the large display 805 in network 806 is determined (S1303). If the result of the determination is that there is traffic at the large display 805, then control proceeds to S1304. At S1304, the fact that a return instruction has not been issued is stored as return request data (whether or not return has been requested and the reply to the request for return of the large display 805).

On the other hand, if it is found at S1303 that there is no traffic at the large display 805, then the recorder 802 issues the return instruction to the large display 805 (S1305). The recorder 802 then receives and stores the return request data (whether or not return has been requested and the reply to the request for return of the large display 805) from the large display 805 (S1306).

Next, the recorder 802 returns to the network 800 based upon the held information concerning network 800 (S1307). The recorder 802 then notifies the access point 801 of the return request data received from the large display 805 (S1308). This processing is then exited.

Described next will be processing by another wireless terminal (here the small display 804) that has received a return request from the access point 801 to return the large display 805 to the network 800.

Figure 14:
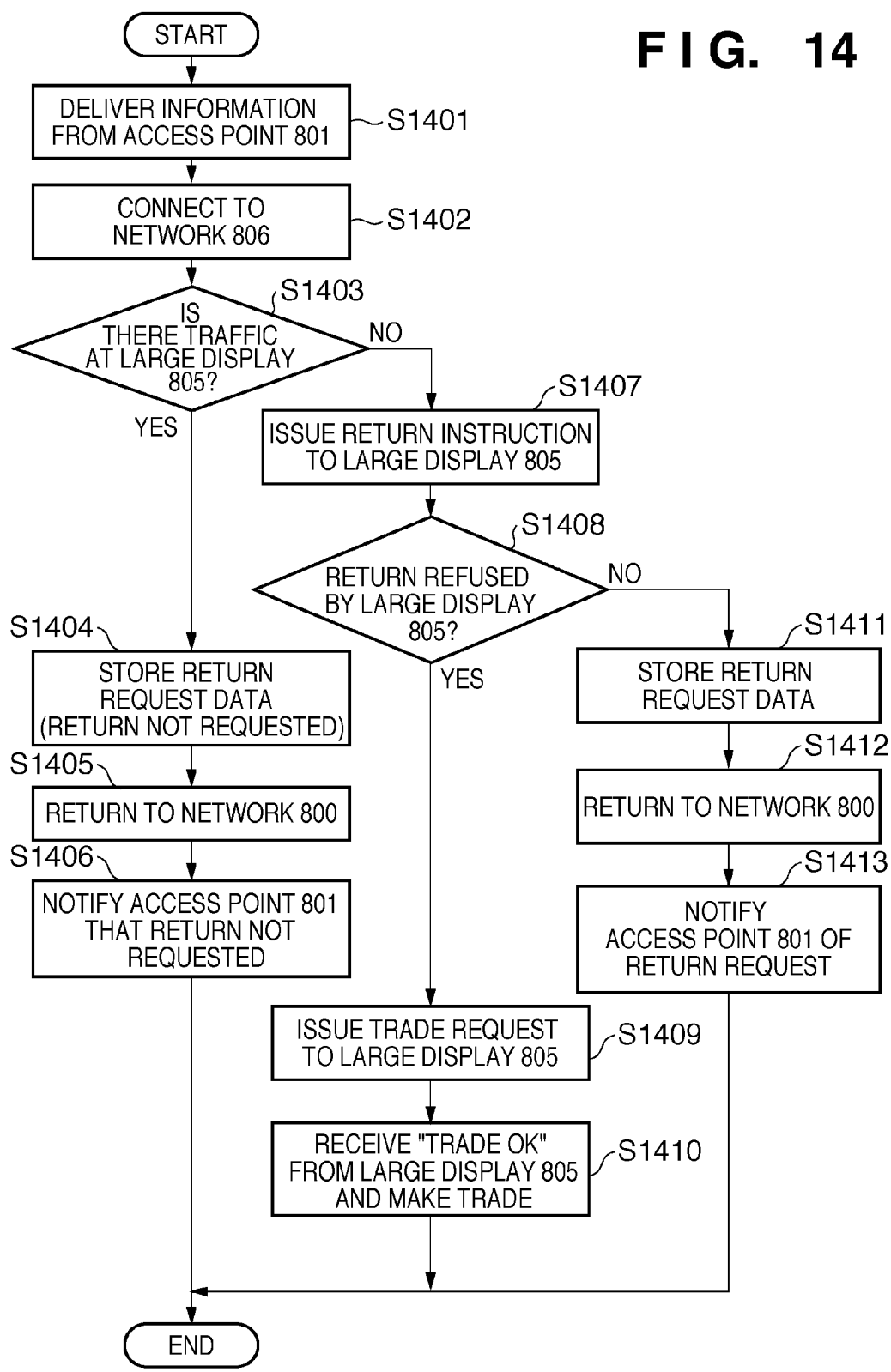
FIG. 14 is a flowchart illustrating return request processing executed by another wireless terminal in the fourth embodiment.

FIG. 14 is a flowchart illustrating return request processing executed by another wireless terminal in the fourth embodiment. It should be noted that the processing of S1401 to S1410 illustrated in FIG. 14 is the same as the processing of S1001 to S1010 in FIG. 10, which has been described in the third embodiment, with the exception of the fact that the processing of S1008 has been changed to decision processing. These processing steps need not be described again.

In accordance with the return request from the access point 801, the small display 804 issues the return instruction to the large display 805 (S1407) and discriminates the return-request reply received from the large display 805 (S1408). If the large display 805 refuses the return request, then, in a manner similar to that of the third embodiment, the small display 804 requests the large display 805 to make a trade (S1409). If a "trade OK" notification is received from the large display 805, then the small display 804 is traded for the large display 805 (S1410).

On the other hand, if it is found at S1408 that the large display 805 has complied with the return request, then the small display 804 stores the return request data (whether or not return has been requested and the reply to the request for return of the large display 805) (S1411). The small display 804 then returns to the network 800 (S1412), notifies the access point 801 of the return request data (whether or not return has been requested and the reply to the request for return of the large display 805) (S1413) and terminates processing.

Thus, even if the return request from the recorder 802 is refused by the large display 805, the small display 804 can instead request the large display 805 to make a trade and the large display 805 can be made to return to the network 800.

The present invention may be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a recording medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes per se read from a computer-readable recording medium implement the novel functions of the embodiments and the recording medium storing the program codes constitutes the invention.

Examples of recording media for supplying the program code are a flexible disk, hard disk, optical disk, magneto-optical disk, CD-ROM, CD-R, magnetic tape, non-volatile type memory card or ROM, etc.

Further, by executing the program codes read out by the computer, not only are the functions of the embodiments implemented but the following is included in the present invention as well: Specifically, an operating system or the like running on the computer executes some or all of the actual processing based upon the indications in the program codes, and the functions of the above-described embodiments are implemented by this processing.

Furthermore, program code read from a recording medium is written to a memory provided on a function expansion board inserted into the computer or provided in a function expansion unit connected to the computer. Thereafter, a CPU or the like provided on the function expansion board or function expansion unit performs a part of or the entire actual process based upon the designation of program codes, and the functions of the above embodiments are implemented by this processing. It goes without saying that such a case is also covered by the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-331066, filed Dec. 21, 2007, which is hereby incorporated by reference herein in its entirety.

What is claimed is:

1. A wireless communication system constituted by a communication apparatus having a management function for managing a first network and a plurality of wireless terminals for performing wireless communication via the first network, wherein said communication apparatus comprises:
  a unit that holds information concerning a second network of which notification has been given from a specific wireless terminal that has left the first network;
  a unit that decides a wireless terminal, which is to be allowed to join the second network, in accordance with predetermined criteria; and
  a unit that notifies the decided wireless terminal so as to cause the specific wireless terminal to return to the first network managed by said communication apparatus; and
said decided wireless terminal comprises:
  a unit that allows this wireless terminal to join the second network and determines communication status of the second network using the held information concerning the second network; and
  a unit that requests the specific wireless terminal to return in accordance with a result of the determination.

2. The system according to claim 1, wherein said communication apparatus receives the result of the return request from the decided wireless terminal and, based upon the result of the return request, confirms that the specific wireless terminal has returned to the first network managed by said communication apparatus.

3. The system according to claim 1, wherein after said wireless terminal constructs the second network and a fixed period of time elapses, said wireless terminal is decided upon determining the terminal capabilities of said wireless terminal and the present communication status thereof based upon terminal information of the first network managed by said communication apparatus and terminal information of the second network.

4. The system according to claim 3, wherein said communication apparatus causes said wireless terminal to actuate a timer that is for the purpose of causing the specific wireless terminal to return and, when the timer times out, notifies said wireless terminal so as to cause the specific wireless terminal to return to the first network managed by said communication apparatus.

5. The system according to claim 3, wherein said wireless terminal is a wireless terminal for which traffic is small in the first network managed by said communication apparatus and, moreover, for which a communication-scheduling timer is not running, or a wireless terminal having a function similar to that of the specific wireless terminal to be returned to the first network managed by said communication apparatus.

6. The system according to claim 1, wherein said communication apparatus notifies the decided wireless terminal of the information concerning the second network and information for returning to the first network managed by said communication apparatus.

7. The system according to claim 1, wherein if the result of the return request from said wireless terminal indicates failure of the return request, then said communication apparatus again decides the wireless terminal that is to be allowed to join the second network and allows this wireless terminal to join the second network.

8. The system according to claim 1, wherein the communication status of the second network is traffic of the second network.

9. A communication apparatus of a wireless communication system constituted by the communication apparatus, which has a management function for managing a first network, and a plurality of wireless terminals for performing wireless communication via the first network, said apparatus comprising:

a unit that holds information concerning a second network of which notification has been given from a specific wireless terminal that has left the first network;

a unit that decides a wireless terminal, which is to be allowed to join the second network, in accordance with predetermined criteria; and a unit that notifies the decided wireless terminal so as to cause the specific wireless terminal to return to the first network managed by said communication apparatus.

10. A communication method of a wireless communication system constituted by a communication apparatus having a management function for managing a first network and a plurality of wireless terminals for performing wireless communication via the first network, wherein said communication apparatus executes:

a step of holding information concerning a second network of which notification has been given from a specific wireless terminal that has left the first network;

a step of deciding a wireless terminal, which is to be allowed to join the second network, in accordance with predetermined criteria; and a step of notifying the decided wireless terminal so as to cause the specific wireless terminal to return to the first network managed by the communication apparatus; and the decided wireless terminal executes:

a step of allowing this wireless terminal to join the second network and determining communication status of the second network using the held information concerning the second network; and a step of requesting the specific wireless terminal to return in accordance with the result of the determination.

11. A non-transitory computer-readable recording medium on which has been recorded a program for causing a computer to execute a communication method of a wireless communication system constituted by a communication apparatus having a management function for managing a first network and a plurality of wireless terminals for performing wireless communication via the first network, the method comprising:

a step of holding information concerning a second network of which notification has been given from a specific wireless terminal that has left the first network;

a step of deciding a wireless terminal, which is to be allowed to join the second network, in accordance with predetermined criteria; and a step of notifying the decided wireless terminal so as to cause the specific wireless terminal to return to the first network managed by said communication apparatus.

* * * * *